Patented Oct. 10, 1950

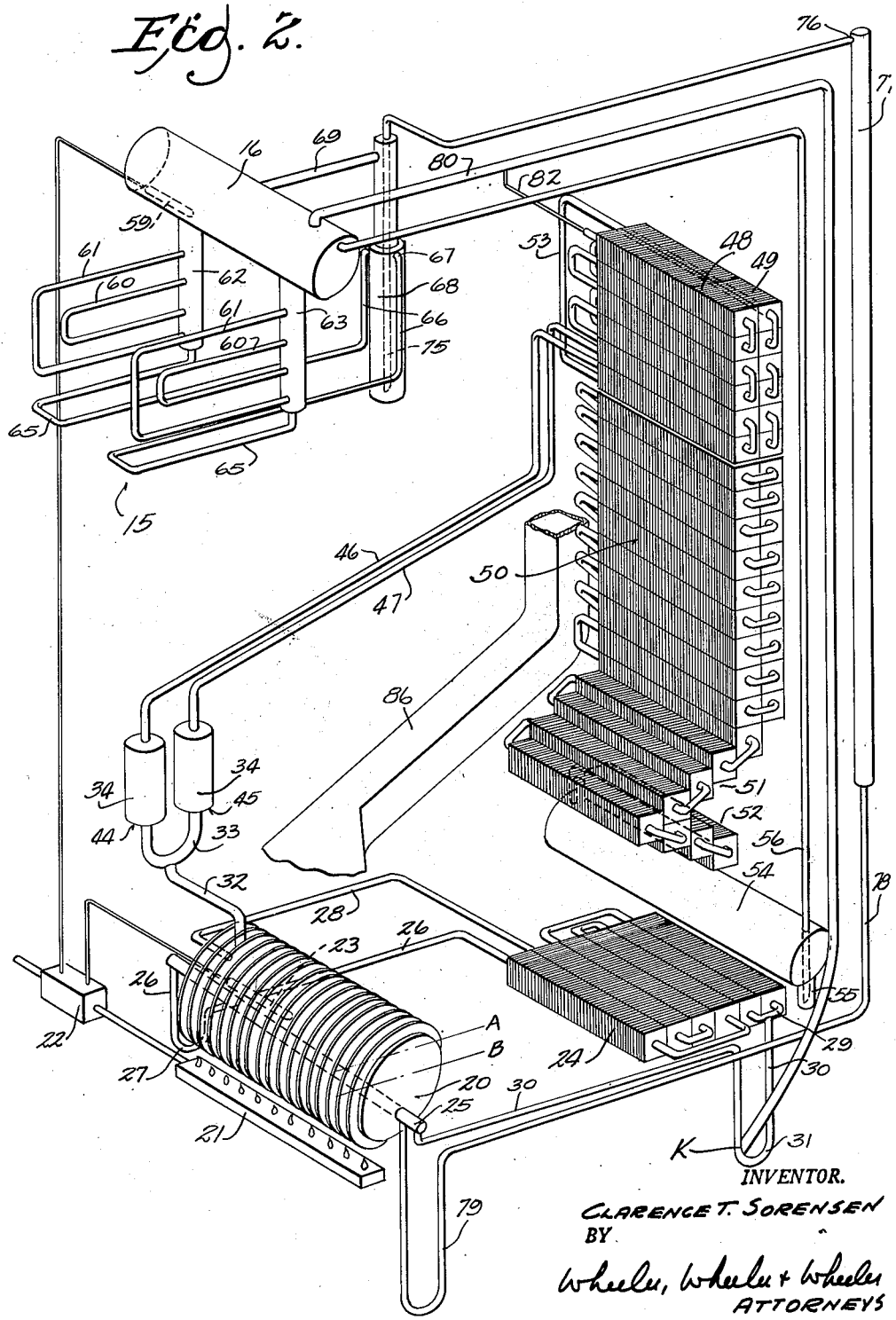

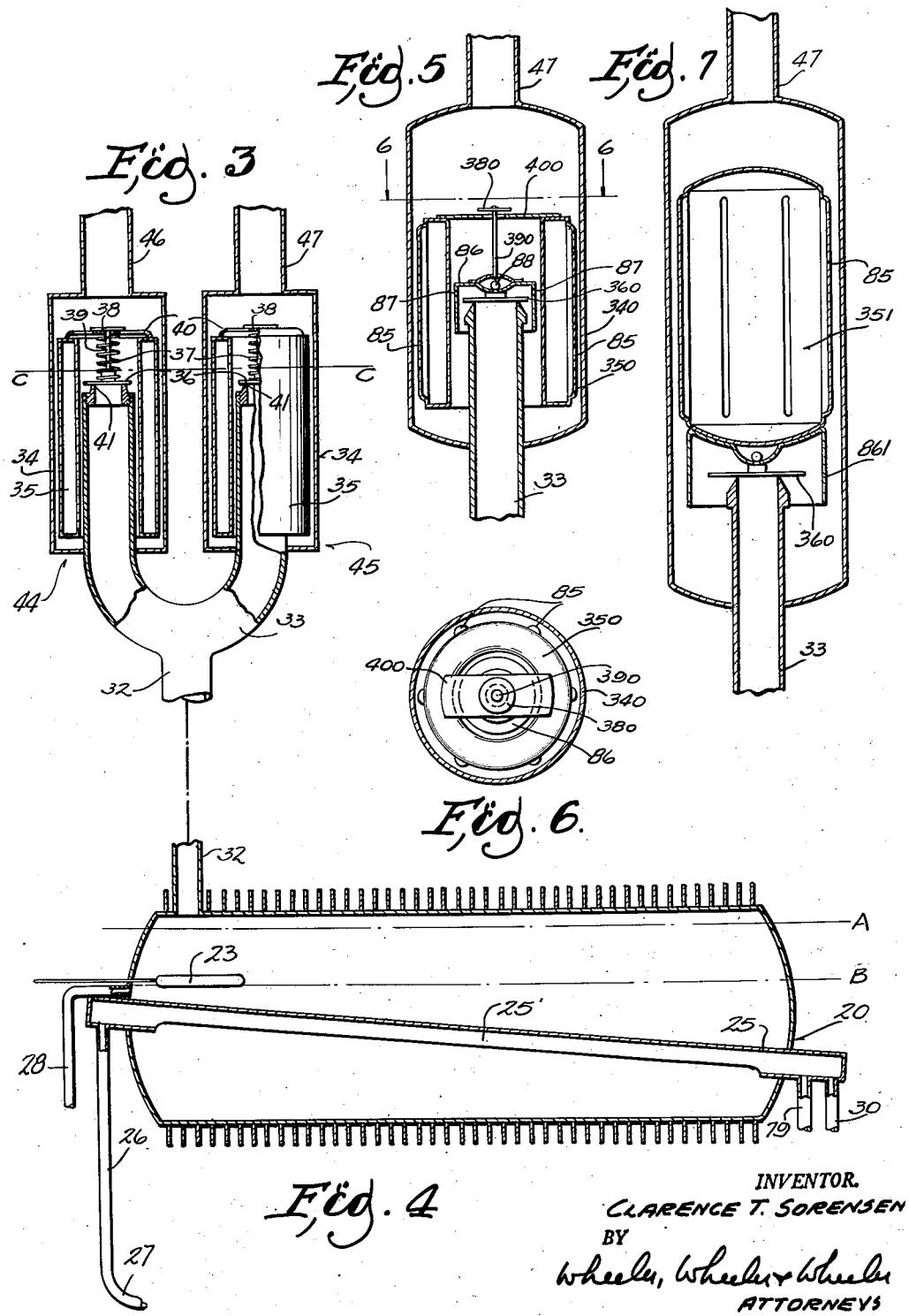

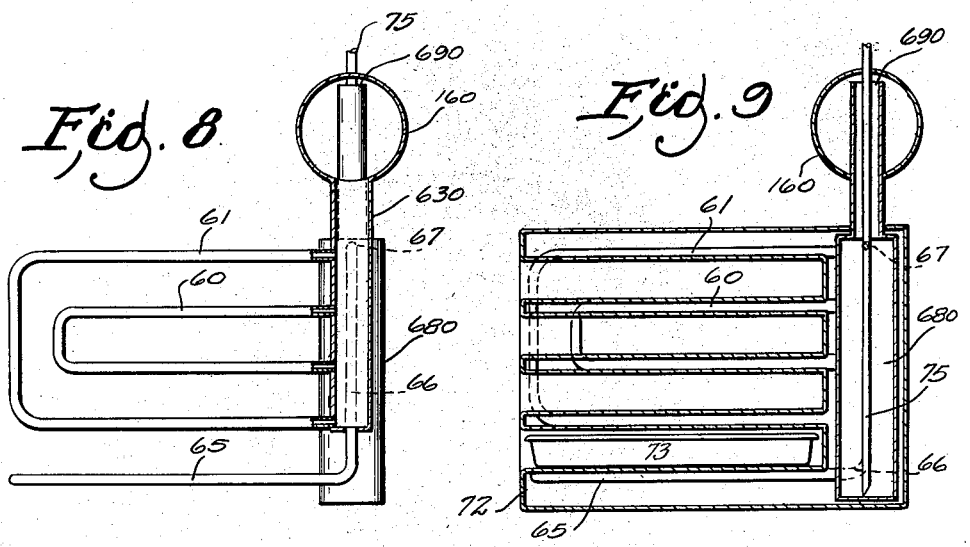
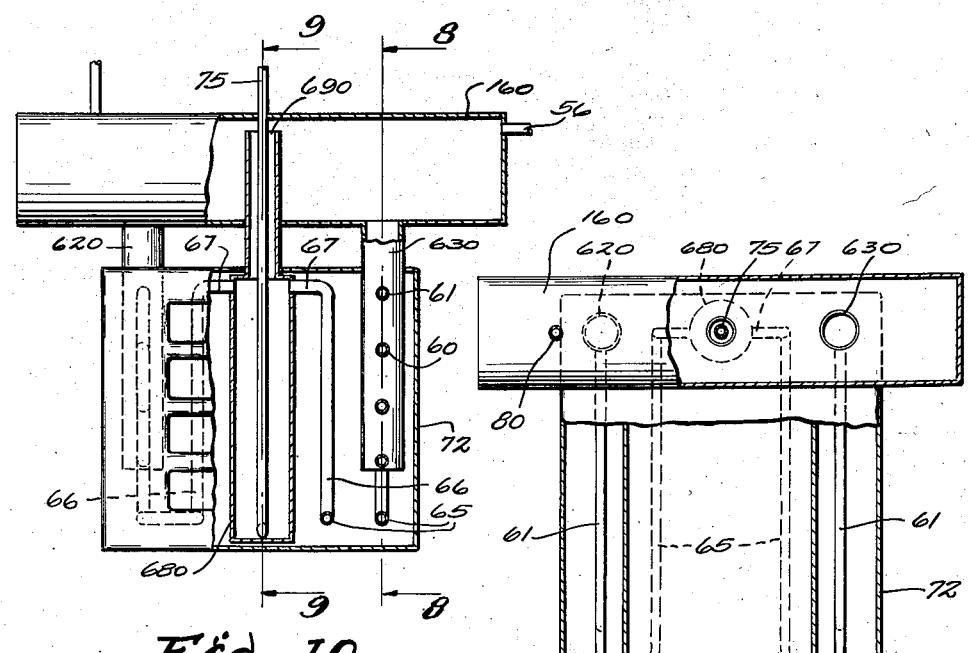

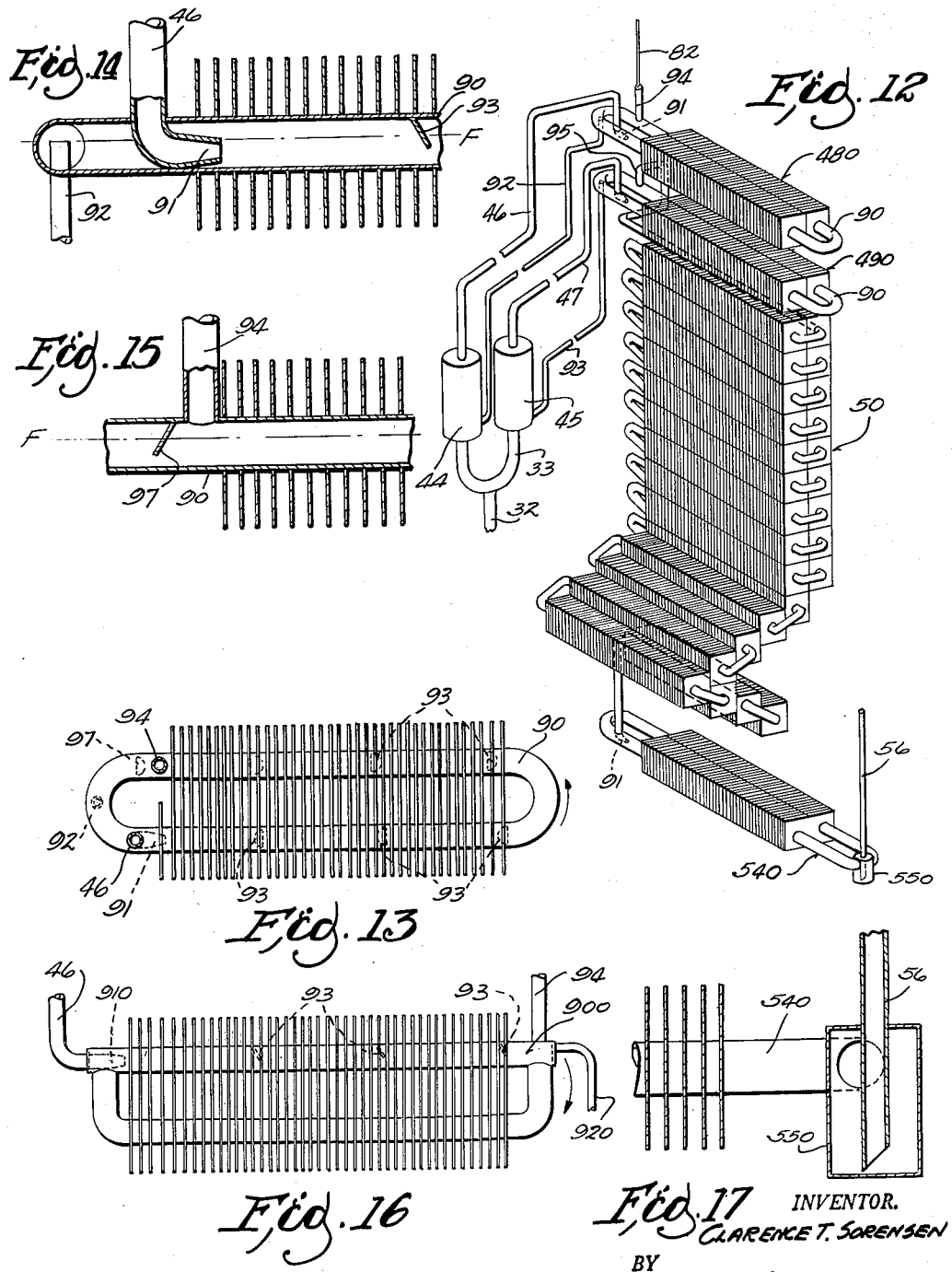

2,525,431

UNITED STATES PATENT OFFICE 2,525,431

ABSORPTION REFRIGERATION SYSTEM AND PROCESS

Clarence T. Sorensen, Lakewood, Ohio, assignor of twelve and one-half per cent to L. S. McLeod, Evanston, Ill., ten per cent to W. H. Kendall, Cleveland, Ohio, five per cent to P. W. Lewis, St. Louis, Mo., and five per cent to W. W. Lorch, St. Louis, Mo.

Application November 13, 1946, Serial No. 709,519

46 Claims. (Cl. 62—118)

This invention relates to improvements in absorption refrigeration systems and processes. The present application is a continuation in part of my copending but now abandoned application Serial Number 417,107 entitled "Absorption Refrigeration Systems and Processes" and filed October 30, 1941. The present application is also a companion to my application Serial Number 131,643, filed November 18, 1949, entitled "Absorption Refrigeration Systems and Processes," which contains claims divided herefrom.

Broadly it is the object of the invention to provide a novel and improved absorption refrigeration system of the cycling type which will function more continuously and economically and efficiently than previous systems of this type. In general, absorption refrigerators of the cycling type establish a much greater pressure differential and are consequently more efficient than absorption refrigerators of the continuously operable type. However, in practice, they have been subject to certain practical disadvantages which it is the primary object of the present application to remedy.

Specifically, it is an object of the present invention to provide for the return of absorbent from the evaporator at the beginning of each evaporation portion of the cycle without at any time draining from the evaporator all of the liquid refrigerant which may remain therein at the conclusion of a cycle. Not only does the return of liquid refrigerant leave the evaporator dry and virtually a part of the condensing system, but the unnecessarily returned refrigerant must be absorbed, re-evaporated, and recondensed with consequent loss of latent heat and a very considerable loss of energy, efficiency and capacity. By keeping such liquid refrigerant in the evaporator during the evaporation portion of the cycle, I not only save these losses but keep from the evaporator hot gases which would otherwise defrost the evaporator and deliver heat thereto which would require removal at the conclusion of the cycle with further loss of efficiency.

Another specific but important feature of the invention relates to the substantial elimination of noise and the improvement of the rate of circulation and absorption by a novel organization in which returning gases accelerate circulation of the absorbent liquid in a loop communicating with the boiler, the circulatory system for the absorbent comprising a section in which the returning refrigerant not immediately evaporated is exposed to the absorbent in the boiler without being released therein, while at the same time relative movement is maintained to facilitate absorption. It is the release of the gases in the boiler which usually contributes most largely to objectionable noise in a refrigerator of the absorption type. All such noise is sought to be eliminated by the present invention.

A further important object of the invention is to provide a balanced system provided with combination float and check valves furnishing a positive seal and yet wholly free of the objections ordinarily made to check valves in a system of this kind. It is my purpose to make the improved float and check valves of my refrigerating system self-cleansing, positive, sensitive, and yet cushioned and provided with a dashpot action. In practice, the improved valve structure is so positive as to maintain its seal under conditions such as would cause substantially complete release of pressure in devices equipped with other types of valves.

A further object of the invention is to facilitate cooling and absorption by the provision of a cooling loop including a radiator almost equal in capacity to the boiler, so that once circulation is established between the boiler and the radiator substantially complete exchange of cool and ammonia free absorbent for warm absorbent is effected.

It is a further object of the invention to facilitate the action of a heat exchanger such as a condensing radiator and to make it more efficient and enable heat exchange to proceed more rapidly with less radiating surface in a device of the present character by circulating a heat exchange fluid, using arriving fluids to maintain the heat exchange fluid in circulation, and forcing the arriving fluids into and through the heat exchange fluid whereby, in the present device, the liquid absorbs heat from the gases during the heat rejecting cycle and delivers off such heat by radiation during intervals when no gases are being supplied to the condenser.

Another objective of the improved organization is to provide a condenser flue structure in which the several radiators required for the functioning of the system can be located successfully in a single flue without mutual interference to maintain a substantially constant flow of cooling air through the flue.

Other objects and a more specific elaboration of the aforesaid objectives and their utilization in the structure disclosed, will appear more fully to those skilled in the art upon study of the following disclosure of the invention.

In the drawings:

Fig. 2 is a diagrammatic perspective showing the circuit connections between the component units of my refrigerating mechanism per se.

Fig. 3 is an enlarged detail view in vertical section through the float and check valve assemblies used in my improved refrigerator system.

Fig. 4 is a vertical axial section on an enlarged scale through the improved boiler used in my system.

Fig. 5 is a fragmentary detail view on an enlarged scale showing a modified embodiment of the combination float and check valve.

Fig. 6 is a detail view taken in cross section on the line 6—6 of Fig. 5.

Fig. 7 is a view similar to Fig. 5 showing a further modified float and check valve arrangement.

Fig. 8 is a view partially in side elevation and partially in section showing a modified evaporator arrangement as it appears without a jacket.

Fig. 9 is a view in longitudinal section on the line 8—8 of Fig. 8.

Fig. 10 is a view of the evaporator of Figs. 8 and 9 largely in front elevation but partially broken away to expose the interior structure in sections.

Fig. 11 is a view in plan of the evaporator of Figs. 8 to 10, portions being broken away to expose the interior structure.

Fig. 12 is a view on a reduced scale fragmentarily illustrated in diagrammatic perspective circuit connections similar to those of Fig. 2 but employing modified condensing radiator arrangements.

Fig. 13 is a view in plan of a modified condenser arrangement such as is illustrated in Fig. 12.

Fig. 14 is an enlarged detail view in vertical section through a portion of the condenser shown in Fig. 13.

Fig. 15 is a view similar to Fig. 14 taken on a different section through the device of Fig. 13.

Fig. 16 is a view in side elevation through a different embodiment of the type of condenser radiator shown in Fig. 13.

Fig. 17 is a fragmentary detail view taken in section on an enlarged scale through a portion of the condenser receiver shown in Fig. 12.

Like parts are identified by the same reference characters throughout the several views.

Figure 1:
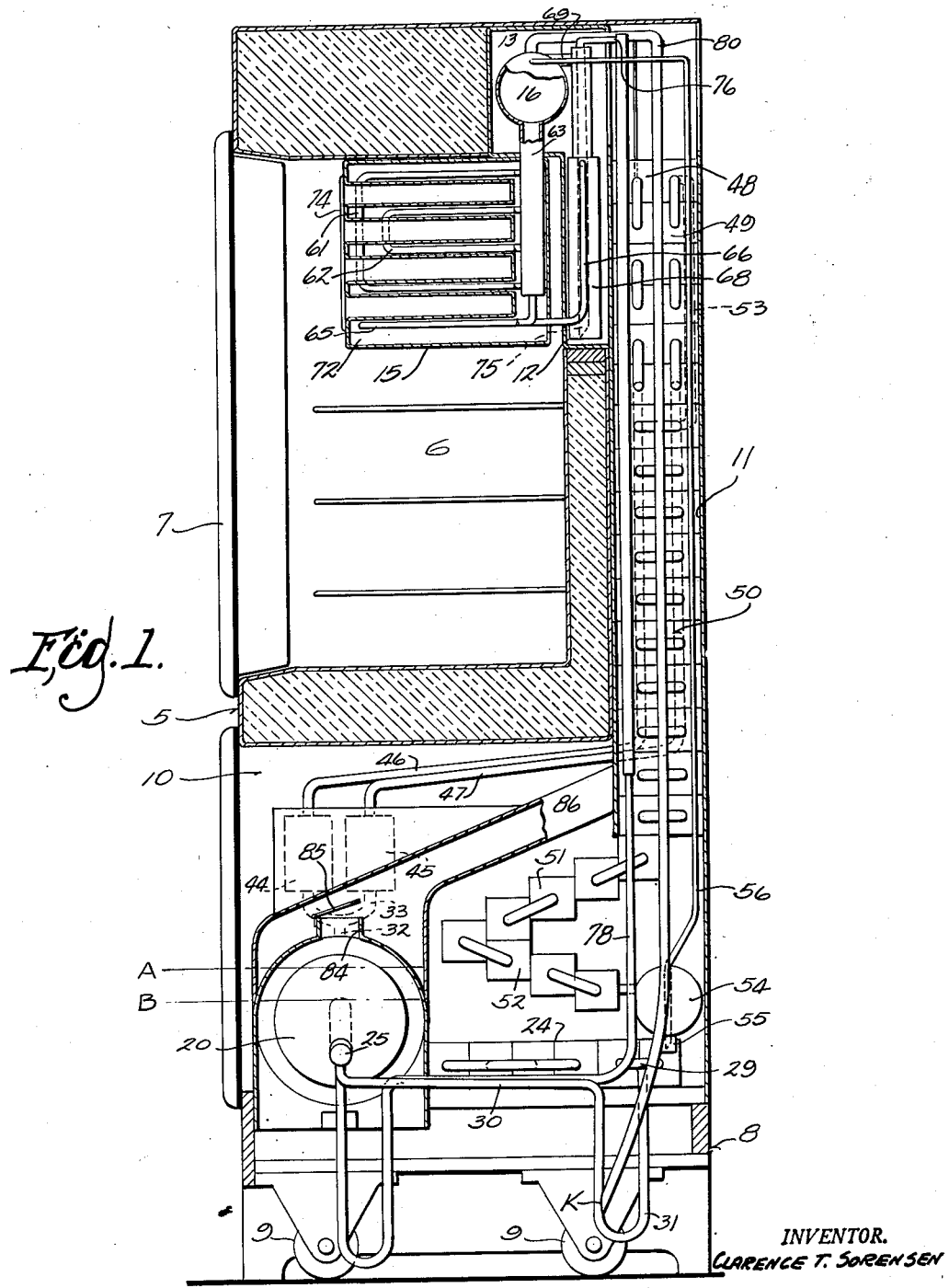
Fig. 1 is a vertical section through a refrigerating cabinet equipped with refrigerating mechanism of the absorption type embodying this invention.

The refrigerating mechanism in its entirety is preferably constructed in a unit to be inserted and removed as such with respect to a suitable cabinet 5 providing an insulated storage chamber 6 and a door 7 giving access thereto. The portable refrigerating unit is assembled upon a truck 8 having wheels or skids at 9 to facilitate its movement. This truck is introduced from the rear into the compartment 10 at the bottom of the cabinet. When installed, the flue structure 11 at the rear of the truck extends up the rear of the cabinet and carries suitably insulated and removable sections 12 and 13 of the cabinet wall upon which the evaporator assembly 15 and the evaporator receiver 16 are mounted.

Having described the general organization, I shall now refer more particularly to Fig. 2 for a detailed description of the component parts and the connections between them.

The boiler or generator 20 may comprise a substantially cylindrical tank lying on its side and peripherally flanged to facilitate heat exchange. Any desired heat may be provided, as exemplified by a burner 21 turned on and off by an automatic valve diagrammatically illustrated at 22, the control for which may be as disclosed in Dillman Patent 2,224,099. Any other controls, manual or automatic, may be substituted so far as the present invention is concerned.

The strong liquid or saturated absorbent may fill the generator substantially to the level indicated at A, at which level the thermostat 23 forming a part of the control system will be covered. The lowest level which the weak liquid absorbent will reach in the generator is represented by the line at B in Fig. 2, at which level the thermostat 23 will be exposed above the level of the liquid.

Between the level of the bottom of the generator and the level represented by the line B, I provide a single or multiple cooling radiator at 24 in an absorbent cooling loop which provides a closed circuit between the radiator and the absorbent liquid in the generator. The hot liquid outlet from the generator is provided from the high end of an inclined pipe 25 which projects from both ends of the generator, as best shown in Fig. 4. Pipe 26 provides a trap at 27 and extends thence to the radiator 24. If a duplex cooling radiator is provided as specifically illustrated in Fig. 2, a separate pipe 28 may issue from approximately the same level in the generator to flow in parallel through the cooling radiator 24. From the discharge portion 29 of the single or duplex cooling radiator coils issues a return pipe 30 provided at 31 with a trap and returning in an upward direction into pipe 25 at its lower end (Fig. 2 and Fig. 4).

Approximately the lower one half of pipe 25 is cut away within the generator or boiler 20, leaving at 25' within the boiler an inverted semi-tubular trough upwardly inclined but maintained at all times below the level of absorbent in the generator. Except for the traps 27 and 31, all portions of the circulatory loop, including cooling radiator 24, are higher than the bottom of the generator and lower than the minimum level of absorbent therein.

Generator 20 is provided with an outlet at 32 for gaseous refrigerant driven from the absorbent during the heating portion of the cycle. The outlet pipe 32 leads to a U-tube 33, the ends of which enter separate float chambers 34 in which floats 35 of annular form carry check and float valves 36 which are yieldably subject to the downward bias of springs 37 to the limited extent permitted by the heads 38 carried by the upper ends of the valve stems 39 engaged with spiders 40 carried by the respective floats. The arrangement is such that each of the valves 36 is carried by its respective float 35 at a level such that it lightly engages the seat provided at 41 at the upper end of the U-tube. Each valve may be lifted from its seat either by pressure communicated through the U-tube (in which case the valve functions as a check valve), or by liquid raising the level of liquid trapped around the ends of the U-tube in the respective float chamber 34 (in which case the valve operates solely as a float valve).

Gaseous pressure communicated to the respective float chambers from above maintains the valves firmly seated, although they respond with great sensitiveness to pressure communicated from below. Even if the light springs provided at 37 failed to operate, the valves would still function as check valves to release pressure communicated to them through the U-tube. The springs 37, however, are so light that normally the valves will open in response to U-tube pressure without materially raising the floats in the liquid trapped in the respective chambers 34. If, however, any sudden pressure is exerted upon the valves in an upward direction the floats, as well as the springs, may respond, and the result is to cushion the valve action and, in effect, to provide a dashpot therefor. In this manner it is possible for the valves to be fully protected against any conceivable injury and yet made extremely sensitive in response to gas pressures. Moreover, in practice, no foreign matter will accumulate to preclude them from sealing because of the fact that they are constantly being washed by returning condensate, as will hereinafter be more fully explained. The valve sets thus specifically described above, are respectively designated by reference characters 44 and 45.

The liquid level in chamber 34 is preferably that indicated by the line C—C in Fig. 3, slightly above the level of the valves 36. This provides a liquid seal about the valves supplementing the effectiveness of the contact of the valves upon their seats. Also, it permits the return of condensate to the generator without loss of gaseous refrigerant since the valves open and close below liquid level.

From the chambers 34 of the valve sets 44 and 45, pipes 46 and 47 lead with a substantial upward pitch to the lower flights of rectifying radiators 48 and 49 respectively. The radiators are preferably identical; the runs of pipe at 46 and 47 are substantially identical, it being desired that pipe 46 and radiator 48 be in balance from a heat exchange standpoint with pipe 47 and radiator 49. Refrigerant evaporated in the generator or boiler 20 passing upwardly through the respective valve sets 44 and 45, is accompanied by a certain amount of absorbent liquid which is unavoidably entrained therewith. The heat exchange capacity of the rectifying radiators 48 and 49 is so determined with reference to normal conditions to which the device is exposed in use, that no appreciable quantities of refrigerant will be condensed in rectifying radiators 48 and 49 but substantially all of the absorbent will be condensed therein and will flow backwardly through the radiators and the pipes 46 and 47 and the valve sets 44 and 45 to the still or generator at 20.

Immediately beneath the pair of rectifying radiators 48 and 49 (in the preferred physical disposition of the parts), I provide a condenser radiator 50 of much larger capacity which may have added sections at 51 and 52 which are so disposed as to facilitate the flow through them of the coldest air circulating in the flue in which the radiator assembly is located. The pipe 53 discharging from the top of rectifying radiator 49, enters the top of condenser radiator 50, such radiator comprising a finned tube which is continuous in a series of convolutions downwardly to its lower end. At its lower end the tube which comprises condenser radiator 50 may communicate with a radiator receiver 54, the use of which is optional since the refrigerant condensed in radiator 50 may, if desired, be discharged directly from the condenser radiator without first being accumulated in the receiving tank 54.

Reference to Fig. 1 will disclose that in actual practice all of the several radiators 48, 49, 50, 51, 52 and 24 are vertically superposed in the cabinet in a space through which air circulation occurs in the flue 11. The cooling radiator 24 and the condenser radiators 50, 51, 52, alternate in giving off heat at different periods of the cycle so that the heat given off by one in no way affects the heat radiating capacity of the other. Together they are practically continuously rejecting heat, thereby maintaining a substantially continuous air current up the flue.

Whether the condensed refrigerant is taken from accumulator 54 or directly from the condensing radiator section 52, there will in either case be a well provided at 55 from which conduit 56 leads upwardly to an upper portion of the evaporator receiver. The bulb 59 of the control thermostat may be located in receiver 16 if desired.

From the bottom of the evaporator tank 16 open the headers 62 and 63 of the evaporator 15. U-shaped tubes 60, 61 extend in communication with each of the headers 62 and 63. Each header, however, is extended downwardly below the bottom of tube 61 and provided with a tube 65 which follows a U-shaped pattern but extends rearwardly and upwardly at 66 and thence horizontally at 67 into a standpipe 68 at an intermediate point. The top of the standpipe is placed in communication by means of tube 69 with the top of the receiver 16.

The several tubes 64 and 65 of the evaporator are preferably immersed in brine in a chamber 72 (Fig. 1) into which open recesses for the ice trays 73 which may be inserted and removed through the door 74 at the front of the brine chamber 72. The brine provides a hold-over to maintain the refrigeration in the refrigerating compartment 6 during the regenerative portion of the refrigerating cycle.

From the bottom of the well which is provided by the closed lower end of stand-pipe 68, leads a conduit 75 which may conveniently be spaced from the extreme lower end of the chamber by beveling its end as shown in Fig. 2. This conduit issues from the top of the chamber and thence extends at 76 into an enlarged duct 77, the lower end of which is drained by pipe 78 leading through trap 79 into the lower end of pipe 25, whereby a return connection is provided for liquid absorbent.

Gaseous refrigerant evaporating in the evaporator tubes 60, 61 headers 62 and 63, pipes 60 and 61, and in the receiver 16, is returned from the top of the receiver 16 through pipe 80 down to one of the lowermost portions of the circuit near the bottom of the trap 31 in the portion of the absorbent circulating loop through which the cooled absorbent is returned from cooling radiator 24 to the generator or still 20. The point of connection is designated at K in Fig. 1 and Fig. 2. The pressure balancing connection from conduit 46 through rectifying radiator 48 to the evaporator is made by means of tube 82 which leads from the top of radiator 48 into the refrigerant return pipe 89, although any other connection at a high level to the upper end of the evaporator or adjusting portions of the system, would serve equally well.

The various traps should desirably be proportioned as follows:

The column of liquid in the tube 75 in the well 68 of the evaporator, as measured from the lower end of the tube 75 to the level of liquid in the evaporator, should at all times be less than the distance between the bottom of trap 79 vertically to the level A (the maximum level of liquid in the boiler generator 20). In practice, I prefer that the extent of trap 79 below the maximum liquid level in the generator be approximately 1½ inches greater than the distance from the bottom of tube 75 to the maximum level of refrigerant in the evaporator.

On the other hand, the distance from the bottom of trap 79 to the minimum level B of liquid in the boiler-generator shall be less than the distance from the bottom of tube 75 to the maximum level of liquid in the evaporator receiver 16.

The vertical distance of point K below the level A which represents the maximum level of liquid in the boiler-generator is also less (preferably by about 1½ inches) than the length of pipe 75 from the bottom thereof to the maximum level of liquid in the evaporator receiver 16.

The device operates as follows:

As generally described in Dillman Patent 2,224,099, the specific controls herein exemplifying the possibility of automatic regulation, are so devised that the heating cycle is initiated by heating the thermostat bulb 59 after such bulb is exposed by the receding level of liquid in the evaporator receiver 16 as the refrigerant therein becomes evaporated for cooling purposes. This opens the automatic valve at 22 supplying fuel to burner 21 and the flame ignited by a suitable pilot (not shown) heats the boiler generator or still 20, and the products of combustion issuing at 84 subject to the control of damper 85 pass out through a special flue at 86 which is independent of the air circulating flue 11 in which the various radiators are exposed to a rising current of otherwise unheated air.

Due to the re-absorption of refrigerant by the absorbent in the still 20, the height of liquid in the still at the commencement of the cycle will be represented approximately by the line A (Fig. 1, Fig. 2 and Fig. 4). While it is broadly immaterial what refrigerant and what absorbent are used, it may for the purposes of this disclosure, be assumed that the absorbent is ordinary water and the refrigerant is ammonia gas.

The heat will expel ammonia gas from the strong liquor in the generator 20, and the ammonia gas, together with such water vapor as is unavoidably entrained therewith, will issue from the generator through pipe 32 and enter the U-tube 33, escaping therefrom through valves 36 into the chambers 34 to the valve sets 44 and 45.

As above noted, the heat rejecting capacity of rectifying radiators 48 and 49 is so chosen as to condense most of the water vapor without condensing the ammonia vapor. The condensate will flow back through pipe 46 and pipe 47 to chambers 34, raising the floats 35 in such chambers and thereby lifting the check valves 36 from their seats to permit the return of the condensate to the generator. Meantime the principal delivery of refrigerant vapor is occurring through the condensing radiator 50, 51, 52, and the condensed refrigerant is being received and stored in the receiver 54 (or in the bottom of the condenser section 52, or both). Some substantial portion of the condensed refrigerant would be delivered directly to the evaporator at this point but for the equalization of pressures throughout the system achieved through pipe 46 and balancing radiator 48 and capillary connection 82 to the top of the system.

The amount of refrigerant delivered to the top of the system will be negligible because the refrigerant so delivered tends to remain gaseous whereas the refrigerant delivered through pipe 47 and rectifying radiator 49 is condensed in radiator condenser section 50, 51, 52, and, occupying considerably less volume in its condensed state, it makes room for the constant accession of further supplies of gaseous refrigerant through this portion of the system. Condensation is, of course, achieved by a combination of high pressure and heat rejection in the condenser radiator sections.

The direct communication of pressure through the balancing pipe 46, rectifying radiator 49, and communicating pipe 82, likewise prevents the absorbent from being forced backwardly up from the generator through either of the return ducts 79 or 80.

So far as the absorption liquid is concerned, it will be apparent that no convection currents will be established between the generator 20 and the loop cooling radiator 24 for the reason that the absorbent is substantially at the same level throughout the circuit comprising the generator, the loops, and radiator 24. Consequently the absorbent will remain substantially non-circulatory in the loop system during the heating phase of the cycle.

When the evaporation has progressed to the point where the absorbent in generator 20 has dropped to the level indicated at B, thereby partially or wholly exposing the thermostatic bulb 23 above the liquid level, the controls will function to cut off the supply of fuel to the burner 21, thus initiating the cooling phase. Air will continue to rise through the heated flue 86 about the fins of the generator 20, rapidly cooling the generator and thereby decreasing the pressures existing in the generator. Pressures will remain high in the rectifying and condensing radiators 48, 49, 50, 51, 52, because the check valves 36 hermetically seating in the valve sets 44 and 45, prevent the maximum pressures achieved during the heating phase from becoming relieved back to the generator. However, the low pressures now existing in the generator will eventually result in at least partial reduction of pressures at the evaporator, the pipes 76—77—78 and 80 affording free communication between the generator and the refrigerator save only for the seals provided at 31 and 79.

As soon as the evaporator pressure drops below the pressure in the condenser radiators, the entire supply of liquid refrigerant accumulated in the condenser radiators and the radiator receiver 54, will be delivered by the existing pressure differential from the well 55 through the pipe 56 to the evaporator receiver 16 which will be substantially filled by the liquid refrigerant thus transferred. Once the transfer of liquid refrigerant commences, it will be accelerated by heat rejected from the radiator 24 as hereinafter described, tending to raise the temperature of the refrigerant in the accumulator 54, thereby increasing the pressure at this point in the system.

As soon as the liquid refrigerant is delivered to the evaporator it will normally commence to evaporate therein. The resulting refrigerant vapor passing through the return pipe 80 to the point K in the trap 31, will bubble into the weak liquor standing in trap 31 and will rise in the return side of trap 31 toward the generator. This will exert a very substantial pumping action initiating the rapid circulation of absorbent through the loop system, including loop cooling radiator 24. Since the weak liquor into which the returning vapor is delivered at K is already cool, reabsorption will immediately commence, and this absorption will continue as the refrigerant bubbles move with the weak liquor in the returning side of the loop toward the generator. If the capacity of radiator 24 is approximately equal to the capacity of the generator at this point in the cycle, this circulation will ultimately completely replace the hot weak liquor in the generator with cool weak liquor from the cooling radiator, leaving the generator filled with cool liquor and leaving substantially all of the warmer weak liquor in the radiator where it may speedily give off its heat.

This heat will be delivered to convection currents of air rising in the flue and these currents will tend to reheat, to a material degree, the accumulator 54, thereby raising the pressure of the refrigerant trapped in this accumulator and accelerating the delivery of the remainder of such refrigerant toward the evaporator receiver 16 as above described.

In the meantime such bubbles as are still entrained unabsorbed in the weak liquor entering pipe 25 at its lower end from loop duct 30, are not released in the generator to bubble noisily to the surface. The weak liquor itself is freely discharged into the generator by reason of the fact that the whole lower half of pipe 25 is cut away. The remaining upper half 25' of pipe 25 serves, however, as an inclined and inverted trough which retains the bubbles in full contact with the weak liquid in the generator and in constantly shifting communication therewith as the bubbles slowly rise by reason of the inclination of the inverted trough. Ordinarily all such gases will be completely absorbed in traversing the length of the inverted trough section 25' of pipe 25, but should any such bubbles fail to be absorbed they are still held against release and returned through pipe 26 to the cooling radiator 24. There are important advantages in delivering the gaseous refrigerant at K into the return side of the loop circuit where it will act upon weak liquor which has already been cooled.

The absorbent, in liquid form, is materially heavier than the refrigerant, and insofar as any absorbent is condensed or passed in liquid form into the evaporator, it will tend to settle to the lowest point in the evaporator system and will therefore be collected in tubes 65 which leads from the lower ends of headers 62, 63. The problem of returning such liquid absorbent from the evaporator to the generator without completely emptying the evaporator of liquid refrigerant is solved by the system disclosed in the following manner.

At that portion of the cycle when the initial cooling of the generator results in delivery of liquid refrigerant from the condenser to the evaporator receiver, the pressure differential created by the influx of liquid refrigerant into the top of the receiver forces out of pipes 65 of the evaporator a substantial part of their entire liquid contents, these being discharged into the stand-pipe 68 midway of the height thereof through duct 67. This operation, therefore, results in delivering into the stand-pipe 68 all of the liquid absorbent which has collected in the evaporator. The proportions of the parts are so determined as to make sure of thus delivering to the stand-pipe all of the liquid absorbent even though some liquid refrigerant may also be similarly delivered to the stand-pipe.

During the entire evaporation phase of the cycle in which the liquid refrigerant is evaporating in the evaporator and the gas is returning to the generator as above described, such liquid absorbent will remain in the well at the bottom of stand-pipe 68. At the initiation of the next heating phase when the burner 21 is again lighted and gas is again expelled from the absorbent in the generator, the initial pressure differential developed in the generator will be communicated immediately through the balancing leg of U-tube 33 and through the valve set 44, pipe 46, rectifying radiator 48 and duct 82 to the top of the evaporator where it will subject to pressure the upper surface of the liquid trapped in the well at the bottom of stand-pipe 68. This pressure will exceed the pressure in the tube 75 which extends downwardly to the bottom of the well for the reason that any back pressure tending to be communicated to tube 75 through trap 79 and pipe 78 is resisted by the head of liquid raised in pipe 78 from trap 79. The result is to establish a pressure differential between the stand-pipe 68 and the tube 75 therein contained, which results in forcing the accumulated liquid from the bottom of the stand-pipe upwardly through tube 75 into tube 76 and thence downwardly through the enlarged pipe 77. The cross section of pipe 77 is sufficiently large with respect to the cross section of tube 76 and tube 75 so that the liquid descending through pipe 77 cannot siphon all of the liquid from the evaporator but can only draw from the stand-pipe 68 such liquid as stands therein below the level of tube 67. It will be noted in Fig. 2 that the well 68 is enlarged from this point downwardly, this being one of several possible means of breaking any siphon action at that point, whereby to prevent any vacuum from being pulled on the upper end of the stand-pipe. As a result, such liquid absorbent as is in the well at the bottom of the stand-pipe is returned, with perhaps a small quantity of liquid refrigerant likewise standing below the level of tube 67 in the stand-pipe. Such remaining body of liquid refrigerant as may have been left in the evaporator tubes 60, 61, 62, 63, 65 at the commencement of the cycle remains undisturbed, as tube 69 balances pressure between tube 68 and receiver 16 to prevent liquid refrigerant from being siphoned back to the generator with purged absorbent.

Thus, by a series of pressure differentials successively established at different intervals in the cycle, I am able to progressively to segregate and return absorbent which reaches the evaporator, without inefficiently returning for re-absorption and re-evaporation any substantial quantities of refrigerant which may exist in liquid form in the evaporator.

By reason of its intermittent cycling as above described, my improved refrigeration system develops pressure differentials which are entirely adequate for the alternate evaporation or condensation of refrigerant without requiring the excessively high pressures which are necessary in the continuous type absorption refrigerators. At the same time, because I have devised a type of valve which has all of the advantages and none of the disadvantages of the conventional check valve, I am able to get much greater pressure differentials than would be obtainable if I were obliged to rely merely upon liquid seals at different points of the system. The resulting action is very positive as compared to the action of other absorption systems of the intermittent type. The means of returning liquid absorbent as above described avoids the delivery of any appreciable quantity of hot gases into the evaporator and at the same time so successfully purges the system with a minimum of refrigerant waste that the hold-over capacity of the brine tank 72 is adequate to prevent defrosting of the quick freezing shelves and ice trays during the heating phase of the cycle.

By way of exemplifying a few of the many structural modifications which are possible within the scope of the foregoing disclosure, I have illustrated in Figs. 5 to 17 alternative forms of check and float valves; an alternative form of evaporator; alternative forms of radiators; and an alternative form of accumulator.

In the check and float valve shown in Figs. 5 and 6, the casing 340 is similar except in form to that shown at 34. The float 350 differs from that shown at 35 in form and also in the desirable provision of ribs 85 which extend vertically at spaced points about its periphery to guide the float from the interior of the casing 340 without obstructing the free passage of liquid about the float. The bridge member 400 is equivalent to spider 40 and is centrally apertured to pass the valve stem 390 which is connected to a cage 86 to which the valve 360 is attached. The cage may take the form of an inverted bell vented at 87. Rising movement of the float 350 is communicated to the cage and valve by means of the head 380 on the valve stem which is picked up by the bridge member or spider 400. There is no spring in this device, gravity serving to seat the valve as permitted by the float.

The valve 360 is swiveled by means of the ball 88 to the cage 86, thereby permitting accurate valve seating regardless of any slight tilting movement of the float.

The embodiment shown in Fig. 7 is similar to that shown in Fig. 5 except that the valve 360 is mounted beneath the float 351 and swiveled to a cage 861 which is in fixed connection with the float. In this construction, the ribs 85 are used as above described and the float is otherwise cylindrical, there being no occasion for making it annular as in the devices of Figs. 3 and 5. These devices function in the system in a manner comparable to the device of Fig. 3.

In Figs. 1 and 2, I have shown the well 68 spaced from the receiver 16 and connected therewith by a pipe at 69. This is a diagrammatic showing of an evaporator which is preferably made in practice in the manner shown in Figs. 8 to 10.

In the preferred embodiment shown in Figs. 8 to 10, a stand pipe 620 and 630 and the well 680 are all aligned in the same vertical plane beneath the receiver 160. Communication between the top of well 680 and the upper portion of receiver 160 to preclude syphonic return of evaporator contents with purged absorbent is achieved by opening the well 680 directly into the receiver at 690, thus eliminating the cross connection tube 69 used in Fig. 1 and Fig. 2. The circulating pipes 60, 61, 65 and 66, and the communication of the latter with the well at 67, may all be precisely as previously described. The disposition of the brine jacket and the recesses for the ice trays also remain unchanged. The tube 75 opens from the bottom of the well in the same manner as in the construction previously described.

I have found that the condensing radiators may be made more efficient to require less material and less space and to operate on a new principle if made as suggested in Figs. 12 to 15.

Each of the rectifying radiators 480, 490, which serve as modified embodiments of the previously described rectifying radiators 48 and 49, is preferably made in the manner clearly shown in Fig. 12 and Fig. 13 to comprise a closed circulatory loop 90 provided with the usual radiating fins and into which the mixed gases delivered from the check and float valve sets are delivered through circulatory flow-inducing nozzles 91 (Fig. 13). Drain pipes 92, 93 connected with the respective circulatory loops maintain normal liquid levels as indicated at F in Fig. 3, below which the nozzle 91 is disposed. Thus the gas issuing from the nozzle 91 engages and entrains the liquid in the circulatory loop 90 to effect circulatory movement thereof around the loop whereby fresh liquid is constantly being presented to the gas issuing from the nozzle. At intervals about the loop, I may provide baffles 93 which extend downwardly below liquid level to force any gas which has separated in the upper part of the loop to re-enter the liquid in order to pass the baffle. I provide outlets 94, 95 from the respective loops 90, communicating with the capillary pressure balancing tube at 82 and outlet 95 communicating with the more conventional condensing radiator 50. Just beyond each of these outlet pipes 94, 95, I provide a much deeper baffle 97 which provides a trap to keep the gases from short circuiting the loop between the inlet and the gas outlet therefrom.

The drain pipes 92 and 93 carry back to the respective valve sets 44, 45 the absorbent liquid condensing in the rectifying loop condenser 480, 490. These are made desirable for the reason that the nozzles 91 preferably enter from above, as shown, whereby separate draining means for returning the weak liquor is appropriate.

Fig. 16 simply shows an alternative arrangement using a loop 900 which is arranged vertically instead of horizontally. The nozzle 910 enters axially of the top leg of the loop. The return pipe 920 opens from the upper part of the top leg of the loop and the several baffles 93 are all located in the top leg of the loop. The bottom leg of the loop replaces the special baffle 97 used in the previously described embodiment to prevent gases from bypassing the several baffles 93 en route to the gas discharge pipe 94.

The accumulator 540 need not necessarily comprise a tank as shown in Fig. 1 and Fig. 2, but may comprise a loop identical with those shown in Figs. 12 or 15 except that the baffles are omitted. Fig. 16 shows a detail of the manner in which the sump 550 connects to the circulatory loop 540.

In these various circulatory loop type condensers, I take advantage of the fact that the gas to be condensed is arriving intermittently. During the interval when no gas is being delivered to the condensers, the fins with which the loop tubes are provided continue to reject heat from the liquid trapped in the loop. Thus, by the time gas is again admitted, the trapped liquid is thoroughly cooled and, as the gas entrains the liquid at the nozzle, thorough admixture is effected and a large and constantly changing liquid surface is presented to the gases to assist in the cooling and condensation thereof. The liquid gives sufficient additional surface to compensate for a greatly decreased length of condenser tube and, at the same time, causes the newly arrived gaseous refrigerant to condense very expeditiously.

Otherwise the modified apparatus embodying any one or more of the several alternative embodiments illustrated operates substantially as above described.

The apparatus and method disclosed in connection with Figs. 12 to 16 are adaptable for heating or cooling a variety of fluids (either gaseous or liquid) through direct contact with an intermediary fluid which is immiscible with the fluid to be heated or cooled and deriving motion from said last mentioned fluid for heat exchange by conduction and convection. Obviously, I do not mean that the two fluids involved must be wholly immiscible, for, in the present case, a certain amount of the gaseous refrigerant will either condense to a liquid and mix with the liquid which is in circulation, or will be dissolved in the circulating liquid. However, it suffices that the fluid to be cooled may separate by gravity or otherwise from the heat exchange fluid, allowing the heat exchange fluid to give up its heat while circulating to another part of its circuitous path.

I claim:

1. A refrigerating mechanism of the character described, comprising in series connection for circuitous flow a generator, a condenser, an evaporator, and communicating piping including check valve means between the generator and condenser, and a pressure balancing connection from the generator to the evaporator and likewise provided with check valve means for sealing said pressure balancing connection against substantial relief of pressures communicated from the generator to the evaporator therethrough.

2. A refrigeration system of the character described, comprising the combination of a generator, condenser, and evaporator and piping connecting them in a closed circuit for circuitous refrigerant flow, said piping including a delivery pipe from the generator to the condenser provided with means sealing said pipe against return of gaseous refrigerant and a return pipe from the evaporator to the generator, a separate pipe returning from the evaporator to the generator and comprising purging means operable through a succession of pressure differentials, and a separate pressure pipe from the generator to the evaporator provided with means sealing it against pressure return, said pressure pipe constituting a pressure balancing connection.

3. In a refrigerator system of the character described, the combination with a generator, of a gas delivery means leading therefrom and provided with a pair of branches, means sealing each of said branches against return of gaseous refrigerant therethrough, rectifying radiators in each of said branches arranged to drain backwardly therethrough to said generator, a condensing radiator to which one of said rectifying radiators is connected, and evaporator pipes leading from the condensing radiator and from the other of said rectifying radiators to upper portions of the evaporator, said evaporator being located above said generator and said condensing radiator, a gaseous return pipe from an upper portion of the evaporator to the generator, and a purging return pipe leading to the generator and comprising a non-siphoning member and a well from the bottom of which said pipe opens, said well having a connection intermediate its height to a low portion of the evaporator and having its upper portion connected to an upper portion of the evaporator.

4. The structure of claim 2 in which the means sealing one of said pipes from the generator comprises a combination float and check valve including a float chamber, inlet means provided with a seat, a valve normally engaging said seat, a float in said chamber to which the valve is operatively connected for movement from its seat upon the rising of said float, a connection between said valve and float comprising lost motion connections upon which said valve is movable as a check valve from its seat independently of said float, said valve being biased for movement respecting said float toward its seat.

5. In a refrigerating system of the character described, the combination with a generator and a refrigerant delivery and condensate return pipe communicating therewith, of means for sealing said pipe against return of gaseous refrigerant while permitting condensate return therethrough, said means comprising a combination float and check valve organization.

6. The combination of claim 5 in which the combination float and check valve organization includes a float chamber, a valve seat affording communication between said float chamber and a portion of said pipe, a float in said chamber, and a valve connected with the float end movable to and from the seat, the relation between the valve seat, the float chamber, the float and the valve being such that said float does not become effective to lift said valve from its seat until the liquid level in said chamber covers said valve.

7. The combination of claim 5 in which the combination float and check valve organization includes a valve seat, an annular float surrounding the seat and a valve member engageable with the seat and yieldably connected with the float for movement from the seat independently of the float, said connection comprising positive means whereby lifting of the float will raise said valve from said seat.

8. The combination of claim 5 in which the float and check valve organization includes a valve seat, a float chamber about the seat, a float in said chamber having buoyancy such as to define a predetermined liquid level respecting said float, and a valve operatively connected with the float and normally engaged with said seat, said valve being disposed below the liquid level of said float and adapted to be lifted from said seat by said float when liquid in said chamber reaches a predetermined level.

9. The combination of claim 5 in which the float and check valve organization includes a valve seat, a float chamber about the seat, a float in said chamber having buoyancy such as to define a predetermined liquid level respecting said float, and a valve operatively connected with the float and normally engaged with said seat, said valve being disposed below the liquid level of said float and adapted to be lifted from said seat by said float when liquid in said chamber reaches a predetermined level, said float being annular and surrounding said seat and valve.

10. The combination of claim 5 in which the float and check valve organization includes a valve seat, a float chamber about the seat, a float in said chamber having buoyancy such as to define a predetermined liquid level respecting said float, and a valve operatively connected with the float and normally engaged with said seat, said valve being disposed below the liquid level of said float and adapted to be lifted from said seat by said float when liquid in said chamber reaches a predetermined level, said float being wholly above said seat.

11. The combination of claim 5 in which the float and check valve organization includes a valve seat, a float chamber about the seat, a float in said chamber having buoyancy such as to define a predetermined liquid level respecting said float, and a valve operatively connected with the float and normally engaged with said seat, said valve being disposed below the liquid level of said float and adapted to be lifted from said seat by said float when liquid in said chamber reaches a predetermined level, said valve having a valve stem provided with a head and said float having a spider with which said head is normally engaged and from which said head may move to permit opening of the valve independently of float movement.

12. A combination float and check valve comprising the combination with a pipe provided with a seat at its top, a chamber surrounding the pipe, an annular float in the chamber rising above said seat, a valve member normally engaged with said seat, a spider connected with the float and spanning said valve member, a valve stem connected with the member and slidable through the spider, means limiting the downward movement of the stem through the spider, whereby a predetermined lifting movement of the float will raise said valve member from its seat, and a spring confined between the spider and said member and biasing the independent movement of said valve toward its seat.

13. In a refrigerating system of the character described, the combination with an evaporator and a generator, of a purger for returning absorbent from the evaporator to the generator in response to varying pressure differentials in the system, said purger comprising a stand-pipe having an evaporator connection intermediate its ends and a substantially closed well at its bottom, a further evaporator connection to an upper portion of the pipe, and a tube having a portion extending from a point near the bottom of said well upwardly from said stand-pipe and having another portion extending to said generator, the last mentioned portion of the tube having an enlarged section precluding siphonic action.

14. In a refrigerating system of the character described, the combination with a generator, of a pressure pipe leading therefrom, a condenser having a uni-directional flow-receiving connection to said pressure pipe, an evaporator, a delivery tube connected from said condenser to said evaporator for the delivery of refrigerant to the evaporator, said evaporator comprising a receiver and evaporating tubes therebeneath, a stand-pipe having a connection near its top to said receiver and having a connection intermediate its height to a portion of the evaporator tubes beneath the point at which such connection is effected to said stand-pipe, and a conduit leading from a level in said stand-pipe below said last mentioned point upwardly from said stand-pipe and having a portion extending to said generator, the last mentioned portion of said conduit comprising means precluding siphonic action therein, whereby said conduit returns to said generator only such liquid as is pumped by pressure differential from said stand-pipe without siphoning liquid from said evaporator tubes.

15. In a refrigerating system of the character described, the combination with a generator having a pressure delivery means including a plurality of branches, each of said branches having means sealing it against gas return to said generator, a condensing radiator in series with one of said branches, an evaporator, a transfer pipe from said condensing radiator to said evaporator, the other of said branches communicating with said evaporator independently of said condensing radiator, and said evaporator comprising an elevated receiver and evaporating passages therebeneath including a collecting tube at a low point in said evaporator adapted to drain therefrom any absorbent carried thereto with the refrigerant, an upward extension of said collecting tube, a well with an intermediate point of which said upward extension communicates, a connection from an upper portion of said well to said receiver, and a return tube leading from a portion of said well below said intermediate point upwardly through the top of said well and having another portion extending to said generator, said last mentioned tube portion comprising means for breaking siphonic vacuum and thereby precluding the siphonic draining of said evaporator.

16. In a device of the character described, the combination with a generator, of a cooling loop having its ends communicating with said generator below liquid level therein, said loop including a radiator above the bottom of the generator and below the minimum liquid level therein.

17. The combination set forth in claim 16 in which the capacity of the radiator is at least approximately as great as the capacity of the generator and means for establishing circulation in said loop, whereby to remove liquid from the generator to the radiator and substitute liquid from the radiator in the generator.

18. In an absorption refrigeration system, the combination with a generator for a refrigerant and absorbent liquid, of an external loop for said absorbent liquid, said loop having its receiving end and its return end communicating with the generator below liquid level therein and including between said ends a radiator above the bottom of the generator and below the minimum liquid level therein, said loop comprising a trap between the radiator and the return end of the said loop, said loop having a portion extending with an upward component of direction toward said generator, a condenser and evaporator in operative connection with the generator, and a refrigerant return pipe from the evaporator to the aforesaid trap portion whereby returning refrigerant will not only pump toward said generator liquid cooled in said radiator but will become re-absorbed in the cooled absorbent so pumped.

19. In an absorption refrigeration system, the combination with a generator and a pressure pipe therefrom provided with means sealing it against return of gaseous refrigerant toward said generator, a condenser with which said pressure pipe communicates, an evaporator, a transfer conduit from said condenser to said evaporator, and a return pipe for gaseous refrigerant from said evaporator, said pipe leading toward the generator, together with a loop for the circulation of absorbent from said generator, said loop having receiving and return ends communicating with said generator below liquid level therein and having between said ends a radiator and an upwardly extending pipe portion between said radiator and the return end of said loop with a lower portion of which the return pipe from the evaporator communicates, whereby gas delivered through the evaporator return pipe will not only cause circulation of absorbent through said loop but will effect re-absorption of the refrigerant in the cooled absorbent between the radiator and the generator.

20. The structure of claim 19 in combination with means providing a flue arranged for convective circulation of air across the radiator and condenser, the radiator being below said condenser in said flue and the generator being intermittently heated and cooled, whereby said condenser and radiator alternately reject heat to the air circulating through said flue.

21. An absorption type refrigeration system comprising the combination with a generator for refrigerant and a liquid absorbent, of a circulatory loop for absorbent having a receiving end and a return end communicating with the generator below liquid level therein and provided between said ends with a radiator substantially at the level of liquid in said generator, and a return pipe section from the radiator to said return end and having a portion extending with an upward component of direction toward the generator, means for the intermittent heating of the generator at spaced intervals, a pressure pipe leading from the generator and provided with means sealing it against return of gaseous refrigerant, said means being adapted to permit the return of liquid to the generator, a rectifier with which said pressure pipe communicates, a condenser in series with the rectifier, an evaporator having a transfer tube leading from the bottom of the condenser, a refrigerant return pipe from said evaporator leading to the upwardly extending return pipe section of said loop whereby to induce circulation of absorbent in said loop, and reabsorption of refrigerant therein during refrigerant return.

22. The device of claim 21 in combination with a separate return pipe from said evaporator to said generator comprising purging means for the restoration of absorbent to said generator.

23. The device of claim 21 in combination with a pressure balancing connection from the generator to the evaporator independently of the condenser and providing a seal against the return of gaseous refrigerant.

24. The device of claim 21 in further combination with means providing a flue, and a separate pressure-balancing connection extending from the generator to the evaporator independently of the condenser and provided with a seal against backward flow of gaseous refrigerant, said pressure-balancing connection including a second rectifier, the radiator of the absorbent circulating loop being located in the flue with the condenser above it and the first and second rectifiers above the condenser in the flue.

25. In an absorption type refrigerator, the combination with an absorbent chamber for liquid absorbent, of a loop having inlet and return ends communicating with said chamber below liquid level therein, the inlet end of the loop being above the return end thereof, means providing an inverted trough extending across said chamber between the return and inlet ends of the loop below liquid level, and means for delivering refrigerant into said loop for circulation with absorbent therein toward the return end of the loop and thence across said chamber below liquid level therein while fully exposed to the absorbent in said chamber for absorption.

26. In an absorption type refrigeration system, the combination with an absorber comprising a chamber for liquid absorbent, of a closed circulatory loop filled with such absorbent and having its inlet and return ends below liquid level in said chamber, said loop including a return side having an upward component, and a refrigerant inlet to said return side whereby gaseous refrigerant admitted through said inlet to said loop will contact relatively cool absorbent to be absorbed thereby while propelling absorbent in said loop, the liquid capacity of the circulatory loop externally of the absorber being at least approximately equal to the liquid capacity of the absorber whereby circulation in said loop will exchange the liquid of the absorber for the liquid in the loop externally of the absorber, said refrigerant inlet being at a low level in said return side whereby to establish such circulation.

27. In an absorption type refrigeration system, the combination with an absorber comprising a chamber for liquid absorbent, of a closed circulatory loop filled with such absorbent and having its inlet and return ends below liquid level in said chamber, said loop including a return side having an upward component, and a refrigerant inlet to said return side whereby gaseous refrigerant admitted through said inlet to said loop will contact relatively cool absorbent to be absorbed thereby while propelling absorbent in said loop, said chamber comprising a pipe projecting from its walls and to the projecting ends of which the inlet and return portions of said loop are connected, said pipe having its lower side portion cut away within the chamber for the release of circulating absorbent, the upper portion of said pipe constituting an inverted trough upwardly inclined from the return end of the loop to the inlet end thereof for carrying gas bubbles across the chamber exposed to the absorbent therein without permitting such bubbles to break to the surface pending their absorption.

28. In an absorption type refrigerator of the character described, an evaporator comprising the combination with a pair of upright headers, of a set of generally horizontal evaporator tubes providing communication between said headers, a receiver with which said headers communicate for supplying refrigerant to said tubes, and holdover means comprising a brine tank with which portions of said tubes are in thermally conductive connection, said brine tank being provided with recesses constituting exteriorly opening, quick-freezing chambers beside which portions of said tubes extend, in further combination with a well opening near its top into the receiver and having an intermediate connection to the lowest point of the header and having a discharge pipe opening from a point near the bottom of the well and slightly below the header and thence extending upwardly at least to the top of the receiver.

29. An absorption refrigeration system comprising the combination with a generator absorber and means intermittently operable for the heating thereof, of a circulatory loop for absorbent having supply and return connections with the generator absorber below the liquid absorbent therein, said loop including a radiator at the level of absorbent in said generator absorber and having an upwardly extending return pipe between the radiator and the generator absorber, an outlet pipe for gaseous refrigerant leading from the generator absorber and provided with a seal against return of gaseous refrigerant, a condensing radiator into which said pipe discharges, said radiator having its outlet in a lower portion, an evaporator including a receiver, a pipe from the condenser outlet to the evaporator receiver, and a plurality of return pipes from the evaporator to the generator absorber, one of said return pipes comprising a gaseous return leading from said receiver to a point near the loop radiator in the upwardly extending return pipe leading from the loop radiator to the generator absorber, the other of the return pipes from the evaporator comprising purging means for returning liquid absorbent from the evaporator to the generator absorber.

30. An absorption type refrigeration system comprising the combination with a generator absorber, a condenser and an evaporator, and means intermittently operable for the heating of the generator absorber, of pressure line means leading from the generator absorber and including separate pressure lines each provided with means sealing the line against return of gaseous refrigerant, one of said lines leading to the condenser and the other to the evaporator, a delivery line for liquid refrigerant from the condenser to the evaporator, and a plurality of return lines respectively connected with upper and lower portions of the evaporator and leading therefrom into operative communication with the generator absorber.

31. The combination recited in claim 30 in which the sealing means in the pressure lines from the generator absorber comprise combination float and check valves including means whereby the valves are hydraulically sealed.

32. The structure recited in claim 30 wherein each of the pressure lines from the generator absorber incorporates a rectifier, and the sealing means therein comprises a combination check and float valve including means for the return of condensate from the respective rectifiers to the generator absorber and the sealing of said valves therein.

33. The structure recited in claim 30 in combination with a circulatory loop for liquid absorbent having its supply end connected at a relatively high level to the generator absorber and having its return end connected at a relatively low level thereto, said loop incorporating heat exchange means and an upwardly extending portion leading from said heat exchange means to the return end of said loop, one of said return pipes from a high portion of said evaporator being connected at a low point to the upwardly extending portion of said loop, whereby gaseous refrigerant returned to said loop will circulate absorbent therein while being absorbed in such absorbent.

34. An absorption type refrigeration system comprising the combination with a generator absorber, of a plurality of pressure line means leading therefrom independently provided with combination float and check valve means providing a seal against return of gaseous refrigerant, rectifying means to which the respective pressure lines lead and which respectively drain to said generator absorber through said float and check valve means, an evaporator with which one of said rectifiers communicates, said evaporator comprising a receiver and evaporating means therebeneath providing a sump, a condenser with which the other of said pressure lines communicates, said condenser having a well in its lower portion, a transfer pipe extending from said well to the evaporator receiver for the delivery of liquid refrigerant thereto, a stand-pipe having its upper end in communication with the evaporator receiver and provided at an intermediate point with an opening materially above said sump, and a pipe affording communication between the sump and said opening in the stand-pipe, a return conduit leading from a point at the bottom of the stand-pipe upwardly to a point near the top thereof and having a portion extending downwardly and communicating with the generator absorber, said conduit including means for precluding siphonic action, and a gaseous return conduit from said evaporator receiver to the vicinity of said generator absorber, a circulatory loop for absorbent having inlet and outlet ends communicating with the generator absorber and provided at an intermediate point with a radiator and with an upwardly extending portion leading from said radiator toward the generator absorber with which the gaseous return conduit from the evaporator reveiver communicates at a level below the outlet end of said loop, whereby gas admitted to absorbent in said upwardly extending loop portion will be readily absorbed in the previously cooled absorbent while engendering a circulation of absorbent in said loop.

35. The structure of claim 34 in which the supply end of the loop leaves the generator absorber at a relatively high level and the return portion of the loop communicates with the generator absorber at a relatively low level, said generator absorbed being interiorly provided with a downwardly open inverted trough extending at an incline between the supply and return ends of the loop through the liquid of the absorber, whereby gas entrained with circulating absorbent in the loop and not fully absorbed therein will be held while exposed to the absorbent in said generator absorber and re-circulated in said loop if not fully absorbed.

36. A process of absorption refrigeration including the heating of strong liquor to expel refrigerant therefrom and to develop refrigerant pressure in a closed circuit, the condensation of refrigerant in one portion of said circuit while holding previously unevaporated refrigerant segregated in another portion of said circuit, the cooling of the weak liquor remaining following the expulsion of refrigerant therefrom and the consequent reduction of pressure on such weak liquor and upon the segregated unevaporated refrigerant while maintaining pressure on the freshly condensed refrigerant pending transfer of the refrigerant as hereinafter stated, the transfer of the freshly condensed refrigerant into contact with the segregated unevaporated refrigerant by the pressure differential thus created, the purging of liquid absorbent from the segregated unevaporated refrigerant under the head of the freshly condensed refrigerant added thereto, the evaporation of the condensed refrigerant and the return of the vapor to the weak liquor and the absorption of such vapor by the weak liquor, the heating of the second cycle of the absorbent strong liquor to expel the refrigerant again therefrom and to regenerate pressure, and the transmission of the pressure so generated to the purged absorbent for the return thereof to the strong liquor at the commencement of said second cycle.

37. Those steps in the process of absorption refrigeration which include the circulating and cooling of absorbent liquid in a circulatory circuit including an absorber and a cooler, the admission of gaseous refrigerant into direct contact with the absorbent liquid in the course of such circulation after the said liquid has passed through the cooler and has been cooled for absorption of the refrigerant by the absorber while circulating therewith, and holding gaseous refrigerant below the surface of the weak liquor in the absorber pending reabsorption of such refrigerant.

38. An absorption refrigeration process comprising the heating of strong liquor and the expulsion of gaseous refrigerant therefrom, whereby to develop pressure in a closed system, the segregation in such system of previously unevaporated refrigerant, the transmission of such pressure to the surface of such segregated refrigerant, the condensation of the refrigerant newly evaporated from the strong liquor, the reduction of pressure upon the remaining weak liquor and said segregated refrigerant while maintaining pressure upon the recently condensed refrigerant, the employment of the pressure differential thus established to deliver the recently condensed refrigerant into contact with the previously unevaporated refrigerant, the purging of absorbent from the previously unevaporated refrigerant under the head of the newly condensed refrigerant delivered thereto, whereby the purged absorbent is raised to a higher level, the evaporation of the condensed refrigerant, the return of gaseous refrigerant toward the weak liquor, the cooling of the weak liquor and the simultaneous admission of the returning gaseous refrigerant to the previously cooled weak liquor, and utilizing the returning gaseous refrigerant to induce circulation of the absorbent simultaneously with absorption of the returning refrigerant and the cooling of such portions of the weak liquor as remain hot.

39. The process of claim 38 in which the strong liquor resulting from re-absorption of gaseous refrigerant in the cooled weak liquor is reheated to initiate a second cycle and again develop pressure, and the pressure thus developed is applied to the segregated and elevated purged absorbent for the return thereof to the strong liquor at the commencement of such second cycle.

40. A repetitive cycle of absorption refrigeration in a closed circuit comprising a still, a condenser, an evaporator and an evaporator sump and connections therebetween, said cycle comprising a process including heating the strong liquor in the still to expel refrigerant therefrom and to develop refrigerant pressure in the circuit, condensing the refrigerant vapor in the condenser while holding previously unevaporated refrigerant segregated in the evaporator, cooling the weak liquor following the expulsion of refrigerant therefrom and consequently reducing pressure in the still while maintaining pressure on the condensed refrigerant in the condenser, applying the pressure differential between the condenser and the evaporator to transfer to the evaporator the freshly condensed refrigerant aforesaid, accumulating liquid absorbent in the evaporator sump under the head of the freshly condensed refrigerant transferred to the evaporator as aforesaid, evaporating refrigerant in the evaporator and returning the evaporated refrigerant to the weak liquor for absorption therein, and initiating a repetition of the cycle by heating the strong liquor while unevaporated refrigerant remains in the evaporator, and applying a portion of the pressure created by the expulsion of the refrigerant from the strong liquor in the repeated cycle upon the surface of the refrigerant remaining in the evaporator to establish a pressure differential for discharging from the sump any liquid absorbent trapped therein and returning such liquid absorbent toward the still.

41. An absorption refrigerator comprising the combination with an evaporator, of a sump comprising a well having restricted communication with the evaporator at a point materially above the bottom of the well and above the bottom of the evaporator, a conduit opening from said well materially below such point of communication with the evaporator, a still with which such conduit communicates, means separate from the conduit and including condenser means affording communication between the still and the evaporator, check valve means controlling said separate means of communication, and means for intermittently heating the still while unevaporated refrigerant remains in the evaporator below the level of communication of the evaporator with said well, said conduit including trap means adapted to establish a differential head across said well during the initial heating of said still whereby absorbent liquid in said well will be delivered through said conduit while unevaporated refrigerant remains in the evaporator.

42. An absorption refrigeration process which includes heating of strong liquor and expulsion of gaseous refrigerant therefrom, whereby to develop pressure in a closed system, the segregation of such system of previously unevaporated refrigerant, the condensation of the refrigerant newly evaporated from the strong liquor, the transmission of such pressure to the segregated refrigerant and the newly condensed refrigerant, the reduction of pressure upon the remaining weak liquor and the segregated refrigerant while maintaining pressure on the recently condensed refrigerant, delivering the newly condensed refrigerant into contact with the previously unevaporated refrigerant subject to the pressure differential thus established, the purging of absorbent from the previously unevaporated refrigerant under the head of the newly condensed refrigerant delivered thereto whereby the purged absorbent is raised to a higher level for return to the weak liquor, the evaporation of the condensed refrigerant, the return of gaseous refrigerant toward the weak liquor, the cooling of the weak liquor and admission of returning gaseous refrigerant to previously cooled weak liquor.

43. The process recited in claim 42 in which the condensation of newly evaporated refrigerant includes the establishment of flow of a heat exchange liquid upon a circulatory path and the delivery of the gaseous refrigerant into said heat exchange liquid for heat exchange therewith, while rejecting heat from said heat exchange liquid to the atmosphere in portions of said path.

44. In an absorption refrigeration system, the combination with a generator-absorber and a pressure pipe therefrom, of a combination check and float valve controlling flow through said pipe and comprising a valve chamber, a float, a valve seat, and a valve connected with the float, a rectifying radiator comprising a circuitously extending pipe constituting a closed circuit, overflow means establishing a liquid level in said pipe and leading to said float chamber for the return of excess liquid, and a gaseous connection from the top of said float chamber to said circuitously extending pipe, and a gaseous vent from said pipe, a conduit from the vent communicating with the evaporator, and a conduit from the vent communicating with the generator-absorber.

45. The combination set forth in claim 44 in which the gaseous connection from the float chamber to said circuitous pipe comprises a nozzle having an orifice disposed below liquid level in said circuitously extending pipe.

46. The combination set forth in claim 44 in which the gaseous connection from the float chamber to said circuitous pipe comprises a nozzle having an orifice disposed below liquid level in said circuitously extending pipe, said pipe being interiorly provided with baffles extending downwardly below the level of liquid in said pipe whereby to redistribute in the liquid of said pipe gas separated from such liquid after issue from said nozzle.

CLARENCE T. SORENSEN.

REFERENCES CITED

The following references are of record in the file of this patent:

UNITED STATES PATENTS

| Number | Name | Date |
|---|---|---|
| 1,536,686 | Mullen et al. | May 5, 1925 |
| 1,627,544 | Isom et al. | May 3, 1927 |
| 1,719,818 | Benoist et al. | July 2, 1929 |
| 1,897,313 | Linnmann | Feb. 14, 1933 |
| 1,911,319 | Jackson | May 30, 1933 |
| 1,946,029 | Midnight | Feb. 6, 1934 |
| 2,003,069 | Carter | May 28, 1935 |
| 2,027,057 | Munters | Jan. 7, 1936 |
| 2,055,733 | Smith | Sept. 29, 1936 |
| 2,092,733 | Gruber | Sept. 7, 1937 |
| 2,177,796 | Allyne | Oct. 31, 1939 |
| 2,221,551 | Nesselmann et al. | Nov. 12, 1940 |
| 2,224,099 | Dillman | Dec. 3, 1940 |